United States Patent Office 3,773,843
Patented Nov. 20, 1973

3,773,843
ALKYLATION OF SATURATED HYDROCARBONS
Louis Schmerling, Riverside, Ill., assignor to Universal Oil Products Company, Des Plaines, Ill.
No Drawing. Filed Dec. 27, 1971, Ser. No. 212,722
Int. Cl. C07c *3/54*
U.S. Cl. 260—666 P
9 Claims

ABSTRACT OF THE DISCLOSURE

Saturated hydrocarbons may be alkylated with an olefinic hydrocarbon as the alkylating agent. The reaction is effected in the presence of a hydrogen chloride compound and a catalyst comprising an organic peroxy compound at a temperature at least as high as the decomposition temperature of the catalyst.

---

This invention relates to a process for the alkylation of saturated hydrocarbons. More particularly this invention is concerned with a process for alkylating saturated hydrocarbons by treating said hydrocarbons with an olefinic hydrocarbon in the presence of a free radical generating compound and a hydrogen chloride compound.

Many chemical compounds are more desirable for various reactions than others. The relatively low molecular weight hydrocarbons are more plentiful in supply but may not be useful as such or as reactants for producing desired compounds. They may be converted to useful and desired compounds by the process of this invention. For example, neohexane, which is useful as a component of motor and aviation fuels where very high octane ratings are desirable, may be prepared according to the process herein after set forth in greater detail utilizing isobutane and ethylene, both of which are in plentiful supply, as the starting materials. Likewise ethylcyclohexane which is used as a fuel component and in various organic syntheses may be obtained from ethylene and cyclohexane. This is also true in the preparation of dimethylpentanes and dimethylhexanes which are also used as fuel components such as intermediates in organic syntheses of various other products.

It is therefore an object of this invention to provide a process for the alkylation of saturated hydrocarbons utilizing an olefinic hydrocarbon as the alkylating agent.

A further object of this invention is to provide a process for the alkylation of saturated hydrocarbons utilizing a free radical generating compound as the catalyst and to increase the yield of the desired product by adding a hydrogen chloride compound to the reaction mixture.

In one aspect an embodiment of this invention is found in a process for the alkylation of saturated hydrocarbons which comprises reacting said hydrocarbon with an olefin in the presence of a hydrogen chloride compound and a free radical generating compound at reaction conditions, and recovering the resultant alkylated hydrocarbon.

A specifiic embodiment of this invention resides in the process for the alkylation of cyclohexane which comprises reacting said cyclohexane with ethylene in the presence of hydrochloric acid and a catalyst comprising di-t-butyl peroxide at a temperature at least as high as the decomposition temperature of said di-t-butyl peroxide, and recovering the resultant ethylcyclohexane.

Other objects and embodiments will be found in the following further detailed description of the present invention.

As hereinbefore set forth the present invention is concerned with a process for the alkylation of saturated hydrocarbons by treating said hydrocarbons with an olefin in the presence of certain compounds. The prior art has shown that while free radical generating compounds induce the reaction of many substances, particularly of halocarbons, with olefins, and of alkyl benzenes with polychloro ethylenes, they do not induce the condensation of olefins with saturated hydrocarbons to give good yields of 1:1 alkylation product. This was shown by the fact that when saturated hydrocarbons are treated with ethylene, for example, in the presence of free radical generating compounds, the reaction product comprised a high molecular weight, grease-like material.

In contradistinction to this, it has now been discovered that when saturated hydrocarbons are treated with olefins in the presence of a free radical generating compound such as a decomposing peroxide, it is possible to obtain desirable yields of monoalkylated products by adding a hydrogen chloride compound to the reaction mixture. In addition, it has also been discovered that the yields of the desired monoalkylated products may be further increased by carrying out the reaction in the added presence of a solid absorbent compound of a type hereinafter set forth in greater detail.

Suitable saturated hydrocarbons which may be alkylated according to the process of the present invention, will include paraffins, both normal and branched-chain in configuration, cycloparafins and alkylaromatic hydrocarbons, the saturated hydrocarbons preferably containing at least 3 carbon atoms and usually containing about 3 to about 12 carbon atoms. Some specific examples of these saturated hydrocarbons which may be used will include propane, butane, isobutane, pentane, isopentane, n-hexane, n-heptane, n-octane, n-nonae, n-decane, n-undecane, n-dodecane, 2-methylpentane, 3-methylpentane, methylhexanes, methylheptanes, methyloctanes, methylnonanes, 2,2-dimethylbutane, 2,2-dimethylpentane, 3,3-dimethylpentane, dimethylhexanes, dimethylheptanes, gem-dimethyloctanes, gem-dimethylnonanes, gem-dimethyldecanes, 2,3-dimethylpentane, 2,3-dimethylhexane, 2,3-dimethylheptane, 2,3-dimethylnonane, 2,3-dimethyldecane, other dimethylalkanes, ethylhexanes, ethylheptanes, ethyloctanes, 2,3-diethylpentane, 2,3-diethylhexane, 2,3-diethylheptane, 2,3-diethyloctane, etc., cyclopentane, cyclohexane, cycloheptane, cyclooctane, methylcyclopentane, methylcyclohexane, methylcycloheptane, ethylcyclopentane, ethylcyclohexane, ethylcycloheptane, 1,2-dimethylcyclopentane, 1,2-dimethylcyclohexane, 1,2-dimethylcycloheptane, etc., toluene, ethylbenzene, n-propylbenzene, isopropylbenzene (cumene), n-butylbenzene, sec-butylbenzene, n-pentylbenzene, methylnaphthalenes, etc., the preferred alkylaromatic hydrocarbons being those containing a tertiary carbon atom or at least one hydrogen atom attached to the carbon atom attached to the aromatic nucleus. It is to be understood that the aforementioned saturated hydrocarbons are only representative of the class of compounds which may be employed as starting materials, and that the present invention is not necessarily limited thereto.

Olefinic hydrocarbons which may be used as alkylating agents in the process of the present invention will include olefins containing from 2 up to about 10 carbon atoms in length, being both straight chain, branched chain and cyclic in configuration. Some representative examples of these olefins will include ethylene, propene, 1-butene, 2-butene, 1 - pentene, 2-pentene, 1-hexene, 2-hexene, 3-hexene, 1-heptene, 2-heptene, 3-heptene, 1-octene, 2-octene, 3-octene, 4-octene, the isomeric straight chain nonenes and decenes, 2-methyl-1-propene (isobutylene), 2-methyl-1-butene, 2-methyl-2-butene, 2-methyl-1-pentene, 2 - methyl - 1-hexene, 2-methyl-1-heptene, 2-methyl-1-octene, 2,3-dimethyl-1-pentene, 2,3-dimethyl-1-hexene, 2,3 - dimethyl-1-heptene, 2,3-dimethyl-1-octene, etc., cyclopentene, cyclohexene, etc. In general, the olefins which contain no tertiary carbon atoms are preferred. It is to be understood, as was the case with the saturated hydrocarbons, that the aforementioned olefinic hydrocarbons are only representative of the class of alkylating agents which may be used, and that the present invention is not necessarily limited thereto.

The catalysts which may be used in the present process are those which are capable of forming free radicals under the reaction conditions. These include peroxy compounds containing the bivalent radical, —O—O—, which decompose to form free radicals which initiate the general reaction of the present invention and which are capable of inducing the alkylation of the saturated hydrocarbon with the olefinic hydrocarbon. Examples of these catalysts include the persulfates, perborates, percarbonates of ammonium and of the alkali metals and organic peroxy compounds. The organic peroxy compounds constitute a preferred class of catalysts for use in the invention and include peracetic acid, persuccinic acid, dimethyl peroxide, diethyl peroxide, dipropyl peroxide, di-t-butyl peroxide, butyryl peroxide, lauroyl peroxide, benzoyl peroxide, Tetralin peroxide, urea peroxide, t-butyl perbenzoate, t-butyl hydroperoxide, methylcyclohexyl hydroperoxide, cumene, hydroperoxide, diisopropylbenzyl hydroperoxide, etc. Mixtures of peroxy compound catalysts may be employed or the peroxy compound catalyst may be utilized in admixture with various diluents. Thus, organic peroxy compounds which are compounded commercially with various diluents which may be used include benzoyl peroxide compounds with calcium sulfate, benzoyl peroxide compounded with camphor, etc. Only catalytic amounts (less than stoichiometric amounts) need be used in the process.

The reaction of the present process involving the aforementioned starting materials is effected at elevated reaction temperatures which should be at least as high as the initial decomposition temperature of the free radical generating catalyst, such as the peroxide compound, in order to liberate and form free radicals which promote the reaction. In selecting a particular reaction temperature for use in the process of the present invention, two considerations must be taken into account. First, sufficient energy by means of heat must be supplied to the reaction so that the reactants, namely saturated hydrocarbons and olefinic hydrocarbons, will be activated sufficiently for condensation to take place when free radicals are generated by the catalyst. Second, free radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C. and 1.7 hours at 145° C. (calculated from data for the first 33% decomposition). A reaction system temperature must then be selected so that the free radical generating catalyst decomposes smoothly with the generation of free radicals at a half life which is not too long. In other words, sufficient free radicals must be present to induce the present chain reaction to take place, and these radicals must be formed at a temperature at which the reactants are in a suitably activated state for condenstion. When the half life of the free radical generating catalyst is greater than 20 hours, radicals are not generated at a sufficient rate to cause the reaction of the process of the present invention to go forward at a practical rate. Thus the reaction temperature may be within the range of from about 50° to about 300° C. and at least as high as the decomposition temperature of the catalyst, by which is meant a temperature such as the half life of the free radical generating catalyst is not greater than 20 hours. Since the half life for each free radical generating catalyst is different at different temperatures, the exact temperature to be utilized in a particular reaction will vary. However, persons skilled in the art are well acquained with the half life vs. temperature data for different free radical generating catalysts. Thus it is within the skill of one familiar with the art to select the particular temperature needed for any particular catalyst. However, the operating temperatures generally do not exceed the decomposition temperature of the catalyst by more than about 150° C. since free radical generating catalysts decompose rapidly under such conditions. For example, when a free radical generating catalyst such as t-butyl perbenzoate is used, having a decomposition temperature of approximately 115° C., the operating temperature of the process is from about 115° C. to about 265° C. When di-t-butyl peroxide having a decomposition temperature of about 130° C. is used, the process is run at a temperature ranging from about 130° to about 280° C. Higher reaction temperatures may be employed, but little advantage is gained if the temperature is more than the hereinbefore mentioned 150° C. higher than the decomposition temperature of the catalyst. The general effect of increasing the operating temperature is to accelerate the rate of the condensation reaction between the saturated hydrocarbon and the olefinic hydrocarbon. However, the increased rate of reaction is accompanied by certain amounts of decomposition. In addition to the elevated temperatures which are utilized the reaction may also be effected at elevated pressures ranging from about 1 to about 100 atmospheres or more, the preferred operating pressure of the process being that which is required to maintain a substantial portion of the reactants in liquid phase. Pressure is not an important variable in the process of this invention, however, because of the low boiling points of some of the reactants it is often necessary to utilize pressure withstanding equipment to insure liquid phase conditions. In batch type operations it is often desirable to utilize pressure withstanding equipment to charge the reactants and catalyst to the vessel, and to pressure the vessel with 10, or 30 or 50 or more atmospheres with an inert gas such as nitrogen. This helps to insure the presence of liquid phase conditions. However, when the mole quantity of reactants is sufficient, the pressure which they themselves generate at the temperature utilized is sufficient to maintain the desired phase conditions. Furthermore, the concentration of the catalyst employed in this process may vary over a rather wide range but it is desirable to utilize low concentrations of catalysts such as from about 0.1% to about 10% of the total weight of the combined starting materials charged to the process. The reaction time may be within the range of from less than one minute to many hours, depending upon temperature and half life of the catalyst. Generally speaking, contact times of at least 10 minutes are preferred.

As hereinbefore set forth the alkylation of the saturated hydrocarbon with the olefinic hydrocarbon in the presence of the aforesaid catalysts is made feasible by the presence of a hydrogen chloride compound in the reaction mixture. The hydrogen chloride compound may be present as anhydrous hydrogen chloride, as concentrated hydrochloric acid or as an aqueous solution of hydrochloric acid, the hydrochloric acid being present in an amount of about 5% to 38% in said aqueous solution. In addition, as will be hereinafter shown, it is possible to increase the yields of monoalkylated product by effecting the alkylation in the added presence of a solid absorbent compound. Specific examples of these solid absorbent compounds will include activated carbon or metal oxides such as alumina, silica, zirconia, magnesia, or mixtures thereof such as silica-alumina, silica-magnesia, silica-zirconia-alumina, silica-magnesia-alumina, etc.

The process of this invention may be effected in any suitable manner and may comprise either a batch or continuous type operation. When a batch type operation is used, a quantity of the saturated hydrocarbon and the olefin (if normally liquid), the catalyst and the hydrogen chloride compound are placed in an appropriate apparatus such as, for example, an autoclave of the rotating or mixing type, said reactor containing, if so desired, a solid absorbing compound such as silica gel, silica-alumina, activated carbon, etc. When a gaseous olefinic hydrocarbon acts as the alkylating agent, it is charged into the autoclave after the other material is sealed therein. The saturated hydrocarbon and the olefinic hydrocarbon which acts as an alkylating agent are present in the reaction mixture in an amount in the range of from about 1:1 up to about 10:1 moles of saturated hydrocarbon per mole of olefinic hydrocarbon. In the event that the olefinic hydrocarbon, the saturated hydrocarbon, or both are not in gaseous form, superatmospheric pressures may be obtained by the introduction of a substantially inert gas such as nitrogen into the reaction zone. Alternatively it is possible that the gaseous olefin or the gaseous saturated hydrocarbon may provide all of the required operating pressure or a portion thereof, the remainder of the pressure being afforded by the introduction of the aforesaid inert gas. Following this, the sealed reactor is then heated to the desired operating temperature, which, as hereinbefore set forth, is at least as high as the decomposition temperature of the free radical generating compound which acts as the catalyst of this reaction and preferably in a range of from the aforesaid decomposition temperature to 150° higher than the decomposition temperature. Upon completion of the desired residence time which may range from about 0.5 up to about 10 hours or more in duration, heating is discontinued and the reactor allowed to return to room temperature. The excess pressure is discharged, the autoclave is opened and the reaction mixture is recovered therefrom. This mixture is then subjected to conventional means of separation which may include washing, drying, extraction, fractional distillation under reduced pressure, etc., whereby the desired alkylated saturated and recovered from any polyalkylated product, unreacted starting materials, hydrogen chloride compound, etc.

It is also contemplated within the scope of this invention that the alkylation of the saturated hydrocarbon with the olefinic hydrocarbon may also be effected in a continuous type of operation. When such a type of operation is used the saturated hydrocarbon, olefinic hydrocarbon and catalyst are continuously charged to a reaction zone which is maintained at the suitable operating conditions of temperature and pressure, said reaction zone containing, if so desired, a solid absorbent compound of the type hereinbefore set forth in greater detail. In addition, the hydrogen chloride compound such as hydrogen chloride or hydrochloric acid is also continuously charged to the reaction zone. The aforesaid reactants may be charged to the reactor through separate lines, or if so desired, one of the reactants or both may be admixed with the catalyst before admittance to the said reactor and the mixture charged thereto in a single stream. After completion of the desired residence time the reactor effluent is continuously removed and subjected to conventional means of separation whereby the desired product is recovered, the unreacted saturated hydrocarbon and the unreacted olefinic hydrocarbon being recycled to the reaction zone to form a portion of the feed stock.

The following examples are given to illustrate the process of the present invention which, however, are not intended to limit the generally broad scope of the present invention in strict accordance therewith.

EXAMPLE I

A mixture of 96 grams (1.14 moles) of cyclohexane, 47 grams of concentrated (38%) hydrochloric acid, and 6 grams of di-t-butyl peroxide in a glass linear was sealed into a rotating autoclave following which 40 atmospheres of ethylene (about 1.3 moles) was pressed in. The autoclave was then heated to a temperature of 130° C. and maintained in a range of from 130° to 140° C. for a period of 4 hours. At the end of this time, heating was discontinued, and the autoclave was allowed to return to room temperature, the final pressure at room temperature being 22 atmospheres. The excess pressure was discharged, the autoclave was opened, and the reaction mixture was recovered. The lower, aqueous layer was separated and the upper layer was washed with water, dried and distilled. There was obtained 24 grams of ethylcyclohexane, which amounted to an 18% yield based on the cyclohexane charge. The major portion of the high-boiling residue (18 grams total) consisted of n-butylcyclohexane and diethylcyclohexanes.

EXAMPLE II

To illustrate the necessity for the presence of a hydrogen chloride compound, the above experiment was repeated charging 90 grams (1.07 moles) of cyclohexane, along with 46 grams of water and 6 grams of di-t-butyl peroxide to the glass liner of a rotating autoclave. After sealing the autoclave, 40 atmospheres (about 1.3 moles) of ethylene was added as before. The autoclave was then heated in the range of from 130° to 140° C. for a period of 4 hours. At the end of this time heating was discontinued and the autoclave was allowed to return to room temperature, the final pressure again being 22 atmospheres. The excess pressure was discharged, the autoclave was opened and the reaction mixture was recovered. The reaction mixture comprised a turbid oil containing a small amount of white powder and an aqueous layer. Distillation of the organic product after separation of the aqueous layer disclosed the presence of no more than about 1 gram (1% yield) of ethylcyclohexane; the distillation residue consisted of 29 grams of turbid viscous oil, most of which boiled above 300° C.

EXAMPLE III

In this example 145 grams (1.72 moles) of cyclohexane was placed in the glass liner of a rotating autoclave along with 6 grams of di-t-butyl peroxide. The autoclave was sealed, following which 18 grams (0.5 mole) of ethylene and 4 grams of anhydrous hydrogen chloride were charged to the reactor. In addition 25 atmospheres of nitrogen was also charged to the reactor so that the initial operating pressure was 40 atmospheres, the 40 atmospheres consisting of 15 atmospheres of ethylene and 25 atmospheres of nitrogen. The autoclave was heated to a temperature of 130° C. and maintained in a range of 130° to 140° C. for a period of 4 hours, the maximum pressure at this temperature reaching 45 atmospheres. At the end of the 4 hour period heating was discontinued and the autoclave allowed to return to room temperature, the final pressure at room temperature being 25 atmospheres. The excess pressure was then discharged and the autoclave was opened, the product consisting of 160 grams of a yellowish layer being recovered. The product was subjected to fractional distillation under reduced pressure and subjected to a gas-liquid chromatographic analysis. This analysis disclosed the presence of 19 grams of ethylcyclohexane, which amounted to a 34% yield of the desired product.

A repeat of the above experiment utilizing 97 grams (1.15 moles) of cyclohexane and 36 grams (1.3 moles) of ethylene as a saturated hydrocarbon and olefin alkylating agent respectively so that the mole ratio of cyclohexane to ethylene was 0.9:1, resulted in the obtention of 20 grams of ethylcyclohexane, which amounted to only a 16% yield of the desired product based on the cyclohexane charge.

EXAMPLE IV

To the glass liner of a rotating autoclave was charged 100 grams (1.19 moles) of cyclohexane, 54 grams (0.48 mole) of 1-octene, 7 grams of di-t-butyl peroxide and 47 grams of an 18% aqueous hydrochloric acid solution. The autoclave was sealed and nitrogen pressed in until an initial operating pressure of 30 atmospheres was reached. The autoclave and contents thereof were then heated to a temperature of 130° C. and maintained thereat for a period of 4 hours, the maximum pressure at this temperature reaching 41 atmospheres. At the end of the 4-hour period heating was discontinued and the autoclave was allowed to return to room temperature, the final pressure at room temperature being 30 atmospheres. The excess pressure was discharged and the autoclave was opened, there being recovered the reaction mixture which consisted of 47 grams of a pale straw-colored aqueous lower layer and 161 grams of a yellow organic upper layer. The water-washed organic layer was distilled and the presence of n-octylcyclohexane as a major reaction product was proved by means of a gas-liquid chromatographic separation followed by infrared and mass spectroscopic analysis.

The above reaction was repeated by heating a mixture of 37 grams (0.44 mole) of cyclohexane and 32 grams (0.29 mole) of 1-octene under reflux at 92° C. The mixture was cooled to room temperature and 3 grams (0.01 mole) of benzoyl peroxide was added. The mixture was again heated under reflux at a temperature of 93° C. for a period of 2 hours. The mixture was cooled, an additional amount of 4 grams of benzoyl peroxide was added and heating was resumed for an additional period of 40 minutes, the temperature remaining at 93° C. during this period. The mixture was again cooled and 10 cc. of concentrated hydrochloric acid was added. Following this the mixture was heated, the flask temperature rising from 93° to 95° C. during the 1-hour period. At the end of this time the product was allowed to cool to room temperature. An additional amount of 3 grams of benzoyl peroxide was added and heating was resumed for a period of 4 hours during which time the temperature rose from 95° to 97° C. At the end of this 4-hour period unreacted cyclohexane was distilled from the product after which benzoic acid began to crystallize out. The undistilled product was washed with dilute alkali following which the 1-octene was distilled out. The bottoms were analyzed by means of gas-liquid chromatography and the desired product comprising n-octylcyclohexane was shown to be present.

EXAMPLE V

To the glass liner of a rotating autoclave was added 6 grams of di-t-butyl peroxide and 40 grams of aqueous hydrochloric acid. The autoclave was sealed and 5 grams (0.96 mole) of isobutane and 28 grams (1.0 mole) of ethylene was charged thereto until an initial operating pressure of 30 atmospheres was reached. The autoclave was then heated to a temperature of 130° C. and maintained in a range of from 130° to 140° C. for a period of 4 hours, the maximum pressure at this temperature reaching 75 atmospheres. At the end of the 4-hour period heating was discontinued and the autoclave allowed to return to room temperature, the final pressure at room temperature being 27 atmospheres. The autoclave was opened and the reaction product consisting of 67 grams of product, consisting of 36 grams of a clear yellow liquid over 31 grams of water-white lower layer was obtained. The upper layer liquid product was analyzed by means of a gas-liquid chromatograph, the presence of 2,2-dimethylbutane (neohexane) and 2,2-dimethylhexane being established thereby.

EXAMPLE VI

A mixture of 127 grams (1.76 moles) of n-pentane, 6 grams of di-t-butyl peroxide and 30 grams of concentrated hydrochloric acid was placed in the glass liner of a rotating autoclave. A sufficient amount of ethylene and nitrogen were pressed into the vessel so that an initial operating pressure of 40 atmospheres was reached, there being 25 atmospheres of ethylene and 15 atmospheres of nitrogen in the mixture. Following this the autoclave was heated to a temperature of 130° C. and maintained thereat for a period of 4 hours. At the end of this time heating was discontinued, the autoclave was allowed to return to room temperature and the excess pressure was discharged. The reaction product was recovered and treated in a manner similar to that set forth in the above examples. Analysis of the product by means of a gas-liquid chromatograph disclosed the presence of 3-methylhexane and 3-ethylpentane.

EXAMPLE VII

In this example 127 grams (1.76 moles) of isopentane along with 6 grams of di-t-butyl peroxide and 30 grams of concentrated hydrochloric acid were placed in a glass liner of a rotating autoclave. A sufficient amount of ethylene and nitrogen were pressed into the vessel so that an initial operating pressure of 40 atmospheres was reached, there being 25 atmospheres of ethylene and 15 atmospheres of nitrogen present. The autoclave was then heated to a temperature of 130° C. and maintained thereat for a period of 4 hours. At the end of the 4-hour period heating was discontinued and the autoclave allowed to return to room temperature, the final pressure at room temperature being 17 atmospheres. The excess pressure was discharged and the reaction product was recovered. The product was analyzed by means of gas-liquid chromatographic analysis which disclosed a 31 mole percent yield of heptanes. The heptanes were shown by gas-liquid chromatography to consist of 86 wt. percent of 3,3-dimethylpentane and 13 wt. percent of 2,3-dimethylpentane.

EXAMPLE VIII

To the glass liner of a rotating autoclave was added 115 grams (1.60 moles) of isopentane, 7 grams of di-t-butyl peroxide, 27 grams of concentrated hydrochloric acid and 24 grams of water. The autoclave was sealed and 50 grams (1.2 moles) of propene was added thereto along with a sufficient amount of nitrogen so that the initial operating pressure was 30 atmospheres, said 30 atmospheres consisting of 15 atmospheres of propene and 15 atmospheres of nitrogen. The autoclave was then heated to a temperature of 130° C. and maintained in a range of from 130° to 140° C. for a period of 4 hours, the maximum pressure at this temperature reaching 49 atmospheres. At the end of the 4-hour period, heating was discontinued and the autoclave allowed to return to room temperature, the final pressure at room temperature being 25 atmospheres. The autoclave was opened and the reaction product consisting of 93 grams of an upper layer and 48 grams of a lower layer were recovered. The upper layer was subjected to fractional distillation and the desired cut was analyzed by means of a gas-liquid chromatograph. The major portion of the product comprised octanes, the chief component being 3,3-dimethylhexane and the next largest component being 2,3-dimethylhexane.

EXAMPLE IX

To illustrate the use of a solid absorbent an experiment was performed in which 123 grams (1.46 moles) of cyclohexane was placed in the glass liner of a rotating autoclave along with 6 grams of di-t-butyl peroxide, 50 grams of concentrated hydrochloric acid, 50 grams of water, and 31 grams of a 200 mesh silica gel. Thereafter the autoclave was sealed and 36 grams (1.3 moles) of ethylene was charged to the autoclave until an initial operating pressure of 40 atmospheres was reached. The autoclave was then heated to a temperature of 130° C. and maintained in a range of from 130° to 140° C. for a period of 4 hours, the maximum pressure at this temperature being 48 atmospheres. At the end of the aforementioned 4-hour period, heating was discontinued and the autoclave was allowed to return to room temperature, the final pressure at room temperature being 6 atmospheres. The excess pressure was discharged, the autoclave was opened and the reaction mixture was recovered therefrom. The reaction product comprising 159 grams of a clear yellow upper layer was subjected to fractional distillation. There was obtained 37 grams of ethylcyclohexane, amounting to 25% of the theoretical yield.

EXAMPLE X

To illustrate the fact that temperature below the temperature at which the half life of the peroxide for 10 hours may be employed providing it is satisfactory to operate at long reaction times, an experiment was performed in which 113 grams (1.34 moles) of methylcyclopentane, 100 grams of 19% hydrochloric acid and 6 grams of di-t-butyl peroxide in a glass liner were sealed into a rotating autoclave and 40 atmospheres (about 1.3 moles) of ethylene was added. The autoclave was then heated to a temperature of 120° C. and maintained in a range of from 120° to 128° C. for a period of 16 hours. At the end of this time heating was discontinued, the autoclave was allowed to cool to room temperature and the excess pressure (9 atmospheres at room temperature) was released. The autoclave was opened, the reaction product was recovered and worked up in a manner similar to that set forth in the above examples. There was obtained about 38 grams (26% of the theoretical yield) of 1-methyl-1-ethylcyclohexane, which was mixed with a small amount of isomeric material.

I claim as my invention:

1. An alkylation process which comprises reacting a saturated hydrocarbon selected from the group consisting of a saturated hydrocarbon having from about 3 to about 12 carbon atoms per molecule with an olefin of from 2 to about 10 carbon atoms per molecule in contact with hydrogen chloride and an organic peroxy compound, at a temperature of from about 50° to about 300° C. and at least as high as the decomposition temperature of the organic peroxy compound and recovering the resultant alkylated saturated hydrocarbon.

2. The process of claim 1 further characterized in that said hydrogen chloride is in the form of hydrochloric acid.

3. The process as set forth in claim 1 further characterized in that said process is effected in contact with a solid absorbent material.

4. The process as set forth in claim 1 in which said organic peroxide is di-t-butyl peroxide.

5. The process as set forth in claim 1 in which said saturated hydrocarbon is cyclohexane, said olefin is ethylene and said alkylated saturated hydrocarbon is ethylcyclohexane.

6. The process as set forth in claim 1 in which said saturated hydrocarbon is cyclohexane, said olefin is 1-octene, and said alkylated saturated hydrocarbon is n-octylcyclohexane.

7. The process as set forth in claim 1 in which said saturated hydrocarbon is isobutane, said olefin is ethylene and said alkylated saturated hydrocarbon is neohexane.

8. The process as set forth in claim 1 in which said saturated hydrocarbon is n-pentane, said olefin is ethylene and said alkylated saturated hydrocarbon is a mixture of 3-methylhexane and 3-ethylpentane.

9. The process as set forth in claim 1 in which said saturated hydrocarbon is isopentane, said olefin is propene and said alkylated saturated hydrocarbon is a mixture of 3,3-dimethylhexane and 2,3-dimethylhexane.

References Cited
UNITED STATES PATENTS

| | | | |
|---|---|---|---|
| 2,909,581 | 10/1959 | Frech et al. | 260—683.43 |
| 2,410,107 | 10/1946 | Sachanen et al. | 260—683.4 |
| 2,410,070 | 10/1946 | Horton | 260—683.47 |

DELBERT E. GANTZ, Primary Examiner

V. O'KEEFE, Assistant Examiner

U.S. Cl. X.R.

260—666 R, 683.47, 683.58